Feb. 13, 1962 D. E. MILLER 3,020,762
GAS WATER HEATER THERMOSTAT
Filed Oct. 19, 1959 2 Sheets-Sheet 1
Fig_1
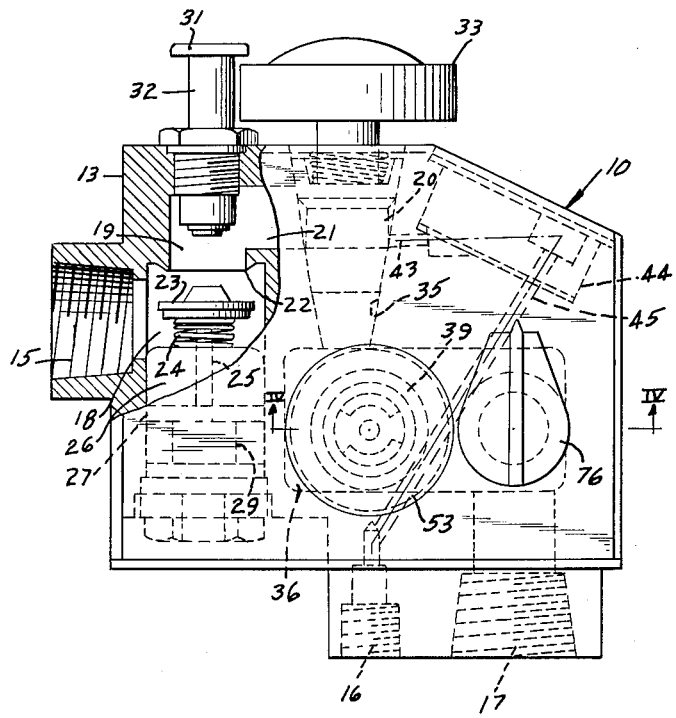
Fig_2
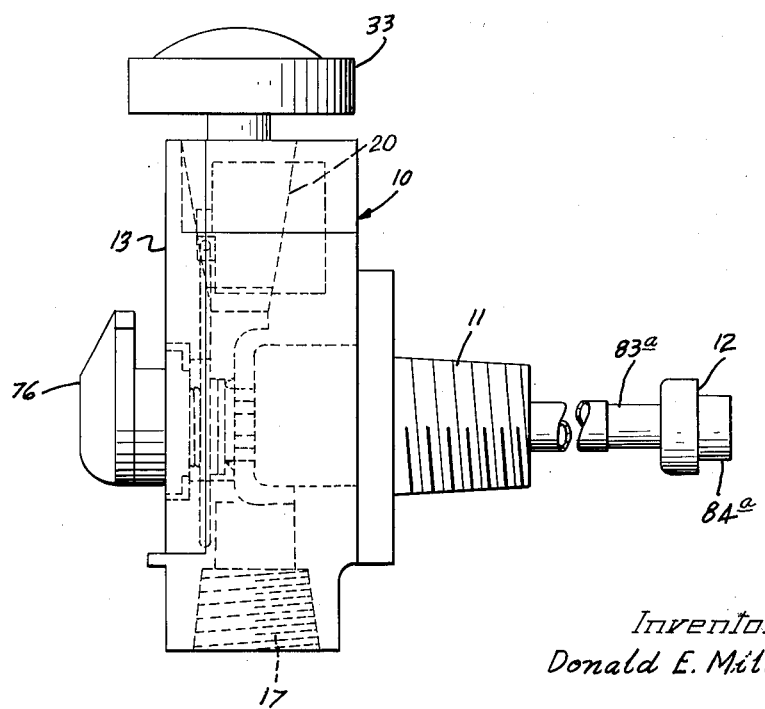
Inventor
Donald E. Miller
by Hill, Sherman, Meroni, Gross & Simpson Attys.

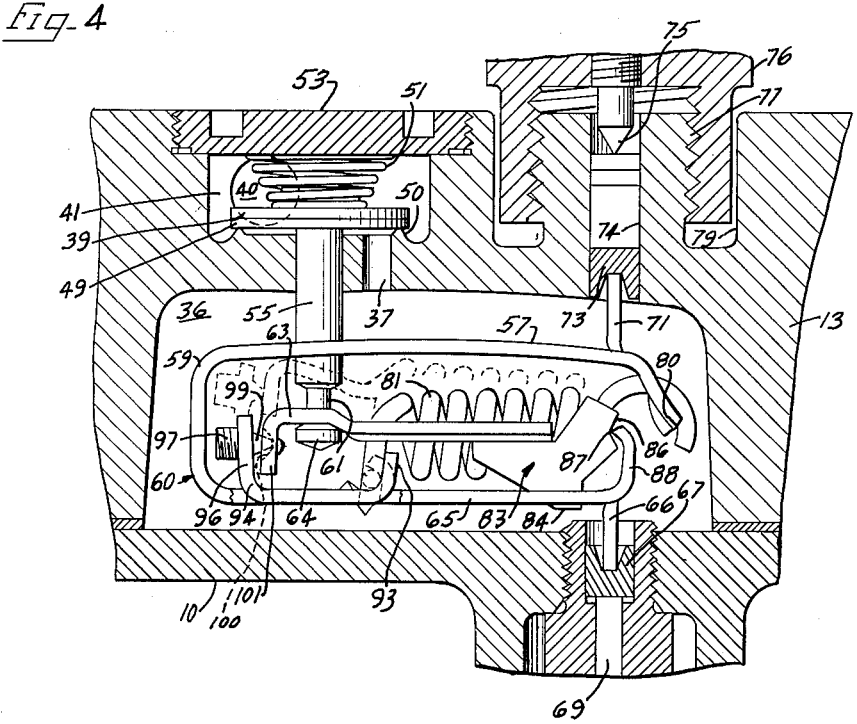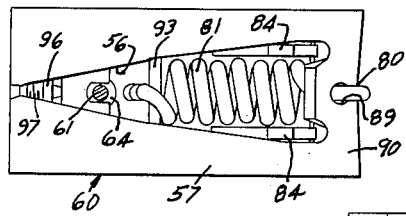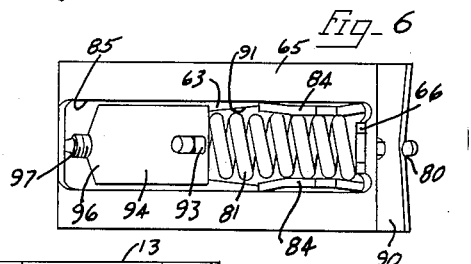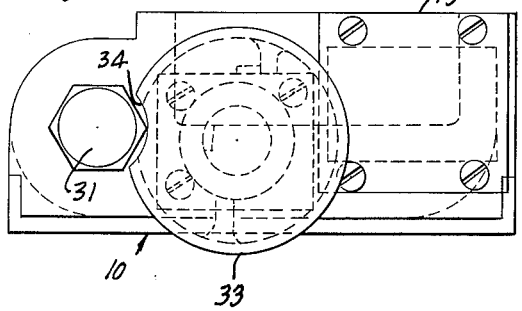

United States Patent Office 3,020,762
Patented Feb. 13, 1962

3,020,762
GAS WATER HEATER THERMOSTAT
Donald E. Miller, Mount Prospect, Ill., assignor to The Dole Valve Company, Morton Grove, Ill., a corporation of Illinois
Filed Oct. 19, 1959, Ser. No. 847,228
4 Claims. (Cl. 73—362.4)

This invention relates to improvements in thermostats and more particularly relates to an improved form of thermostatically operated gas valve particularly adapted for controlling the supply of gas to hot water heaters and the like.

A principal object of the invention is to provide a simple and improved safety shut-off and thermostatic valve for gas burners and the like arranged with a view towards utmost efficiency in construction and operation.

A further object of the invention is to provide an improved form of thermostatic gas valve controlling the flow of gas to a main burner for a hot water heater and the like, having an improved form of snap-acting thermostatically operated mechanism for opening and closing the gas burner supply valve with a snap-action.

A still further object of the invention is to provide a simplified form of snap-acting mechanism particularly adapted for thermostatically controlled gas valves, arranged with a view toward simplicity in construction and efficiency in operation and control.

Still another object of the invention is to provide an improved form of gas water heater thermostat, in which a simple and improved snap-acting mechanism is provided to operate the thermostatic valve at a selected temperature range, and in which the frame for the snap-acting mechanism acts as a return spring for the thermally responsive element of the thermostat.

Still another object of the invention is to provide an improved form of snap-acting thermostatically operated actuating mechanism, utilizing a fusible thermally responsive material for extensibly moving a power member of a thermal element upon certain temperature rises, in which the frame for the snap-acting mechanism serves as a return spring for the power member of the thermal element upon reductions in temperature, in which a snap link serves as the actuator for the snap-acting mechanism and has a lost motion connection with the device to be operated thereby, to assure a snap-action operation of the device to be operated at the operating temperature range of the thermal element.

These and other objects of the invention will appear from time to time as the following specification proceeds and with reference to the accompanying drawings wherein:

FIGURE 1 is a plan view of a safety gas shut-off and thermostatically controlled valve constructed in accordance with the invention, with certain parts broken away and certain other parts shown in section;

FIGURE 2 is a view in side elevation of the valve shown in FIGURE 1;

FIGURE 3 is an end view of the valve shown in FIGURE 1, and showing the relationship of the reset button with respect to the operating knob for the main gas cock;

FIGURE 4 is a fragmentary sectional view taken substantially along line IV—IV of FIGURE 1, and illustrating the snap-acting mechanism for operating the thermostatically operated valve of the gas burner;

FIGURE 5 is a top plan view of the snap-acting mechanism; and

FIGURE 6 is a bottom plan view of the snap-acting mechanism.

In the embodiment of the invention illustrated in the drawings, I have shown a thermostatic gas supply and safety shut-off valve 10 of a type particularly adapted to control the flow of gas to the main and pilot burners of hot water heaters and the like. The valve 10 is shown as having a threaded boss 11, which may be threaded within a fitting (not shown) in the wall of a hot water tank, to position a thermostatic element 12 in contact with the hot water within the hot water tank.

The valve 10 comprises a valve body 13 having a gas inlet 15 leading thereinto, a pilot gas outlet 16 leading from said valve body, and a main burner gas outlet 17 leading from said valve body in spaced relation with respect to said pilot gas outlet.

Gas enters the valve body 13 through the inlet 15 into a chamber 18 having a transverse wall portion defining a port 19, leading from said chamber and having communication with a main gas cock 20 through a passageway 21. The port 19 has a seat 22 extending thereabout, facing the chamber 18 and adapted to be engaged by a safety shut-off valve 23 biased into engagement with the seat 22 by a spring 24 and held open by thermal electric current generated by the heat of the pilot flame. The safety shut-off valve 23 is a disk type of valve engaging the seat 23 on its face and having a stem 25 extending therefrom in a direction away from the seat 22 through the center of the spring 24.

The stem 25 is suitably guided within a casing 26 for a thermal electric magnet, and has an armature 27 on its inner end, engageable with an electromagnet 29, when setting the valve, for holding the valve open by thermal electric current generated by the heat of the pilot flame. A thermocouple (not shown) may be positioned adjacent the flame issuing from the pilot burner (not shown), supplied with gas through the pilot outlet 16 for generating thermal electric current when heated by the flame issuing from the pilot burner, and energizing the electromagnet 29, to hold the valve 23 open, as long as the pilot is lit, as is well known to those skilled in the art, so not herein shown or described further.

A reset button 31 on the outside of the valve body 13 and on the outer end of a plunger 32 is provided to initially open the valve 23. The plunger 32 slidably extends within the valve body 13 in alignment with the center of the valve 23 and is movable to move the valve 23 off its seat when an operating knob 33 for the main gas cock 20 is in its pilot position. This will accommodate the flow of pilot gas through the pilot outlet 16, when lighting the pilot burner. The reset button is depressed to hold the valve 23 off its seat until sufficient thermal electric current has been generated, by the heat of the pilot flame, to hold the valve 23 open as long as the pilot burner is lit. The knob 33 has a notch 34 formed therein and opening to the periphery thereof. The notch 34 accommodates depression of the plunger 32 when the gas cock 20 is in its pilot position. The button 31 normally extends over the knob 33 and is biased in the outwardly extended position shown in FIGURE 1 by a spring (not shown), the knob 33 preventing resetting of the valve 23 except when said knob is in its pilot position.

The main gas cock 20 is a well known form of frusto-conical plug valve, rotatably carried in a frusto-conical seat 35, opening at its inner end into a chamber 36 having communication with the outlet 17 through a port 37 leading from the chamber 36, a thermostatically operated valve 39, and a port 40 leading from a chamber 41 for the valve 39.

When the valve 20 is in its pilot position, gas will flow from the frusto-conical valve chamber 35 through a passageway 43 into a filter 44, through the filter and to pilot outlet 16 through a passageway 45.

When the main gas cock 20 has moved from its "pilot" position to its "on" position, the flow of gas will be through the outlet 43 to the pilot outlet 16, in the manner just described, and through the center of the gas cock 20 into the chamber 36 and out the main gas burner outlet 17, under the control of the thermostatically operated valve 39.

Referring now in particular to the thermostatic valve 39 and to the snap-acting thermostatically operated mechanism for operating said valve, the valve 39 is shown as being a disk valve having a resilient valve face 49 engaging a seat 50 in the chamber 41, and extending about the outlet passageway 37. The valve 39 is biased into engagement with the seat 50 by a conical spring 51, seated on the outer face of the valve 39 at one end and, at its opposite end on the inner face of a plug 53, threaded within the valve body. The valve 39 is thus spring biased into its closed position, and is opened upon certain reductions in temperature of the hot water within the hot water tank (not shown), sensed by the thermally responsive element 12.

The valve 39 has a valve stem 55 extending within the chamber 36 and guided in the wall of said chamber and extending through an open portion 56 of an upper leg 57 of a generally U-shaped main spring 59 for a snap-acting mechanism 60, for opening and closing the valve 39 with a snap-action.

As shown in FIGURE 4, the valve stem 55 has a reduced diameter inner end portion 61 slidably mounted on a snap link 63 of the snap acting mechanism 60 and having a head 64 on its lower end engaging the underside of the snap link 63. The recess formed by the reduced diameter portion 61 of the valve stem 55 thus forms a lost motion connection between the snap link 63 and the valve stem 55, accommodating the opening and closing of the valve 39 with a snap-action, by operation of the snap link 63.

The main spring 59 has a lower leg 65 having a rectangular tongue 66 depending from the free end of said leg and seated in the rectangular slot of a slotted seat 67 engaged by the inner end of a piston 69, for the thermally responsive element 12 and operated by said piston. The slotted seat 67 is guided for movement towards and from the longitudinal center of the main spring 59, and the piston 69 extensibly moving said slotted seat towards the longitudinal center of said main spring 59 and controlling retractible movement of said slotted seat, effected by operation of the main spring 59 upon reductions in temperature, serves as the actuator member for the snap-acting mechanism, as will hereinafter more clearly appear as this specification proceeds. The upper leg 57 of the main spring 59 has a rectangular tongue 71 extending upwardly therefrom and engaging within the rectangular recess of a recessed seat 73, guided in a passageway 74 leading from the chamber 36. The seat 73 is abutted at its outer end by a calibrating screw 75, threaded within a temperature adjustment knob 76. The temperature adjustment knob 76 is threaded on a threaded boss 77 encircling the passageway 74 and within an annular recessed portion 79 of the valve body 13.

The main spring 59 is thus mounted between the seats 67 and 73, is retained in said seats by the resiliency of said spring, and the rectangular slots in said seats retain said main spring in the desired position in the chamber 36. When it is desired to increase the temperature at which the valve 39 closes, the temperature adjustment knob 76 is turned in a direction which will result in the raising of the upper spring seat 73. This will result in upward movement of a hinge 80 for an actuating spring 81 and will change the line of pivot centers of the snap-acting mechanism as will hereinafter more clearly appear as the specification proceeds. In a contrary manner when it is desired to decrease the temperature at which the valve 39 closes, the upper seat 73 is moved downwardly or inwardly toward the chamber 36.

The piston 69 of the thermally responsive element 12 is extensible from a cylinder 83a, extending from a casing 84a of the thermally responsive element. The thermally responsive element 12 is shown as being of the so-called power type of thermally responsive element, such as is shown and described in the Vernet Patent No. 2,368,181, dated January 30, 1945. In such thermally responsive elements, a fusible material contained within the casing 84a for the element, reacts against a flexible membrane (not shown), upon increases in temperature of the hot water to which the casing 84a is subjected, to the fusion point of the fusible thermally expansible material, to extend the piston 69 with respect to the cylinder 83a.

Referring now in detail to the snap mechanism 60, the snap link 63 is rigidly carried at its end adjacent the open end of the main spring 59 on a hinge member 83 having spaced legs 84 slidably guided in an open portion 85 of the lower leg 65 of the main spring 59. The legs 84 each have a generally V-shaped recess 86 therein opening toward the open end of the main spring. The recesses 86 are aligned and engage and fulcrum about a knife edge fulcrum 87, at the apex of the V of the V-shaped recesses 86. The knife edge fulcrum 87 is formed on the inturned end of a tongue 88 extending upwardly from the lower leg 65 of the main spring 59.

The snap spring 81 provides the force required to achieve snap acting opening and closing of the valve 39, and extends through an aperture 89 of a tongue 90. The tongue 90 is formed integrally with the upper leg 57 of the main spring 59 and extends angularly outwardly of the end of said leg toward the longitudinal center of said main spring, and shown in FIGURE 4 as being spaced horizontally outwardly of the tongue 88. The snap spring 81 is seated at the outer end of said tongue on the hinge 80, previously referred to.

The snap spring 81 extends along the snap link 63, in an open portion 91 thereof (FIGURE 6) and is connected at its end opposite the hinge 80 on a hooked end portion 93 of a spring tensioner 94. The spring tensioner 94 extends within the open portion 85 of the lower leg 65 of the main spring 59. The spring tensioner 94 has an upwardly turned leg 96, extending in the space between the closed end of the main spring 59 and the inner end of the snap link 63. The upturned leg 96 has a spring tensioner screw 97 threaded therein, having a conical engaging end portion 99 engaging within a generally conical recess 100 formed in a downturned inner end 101 of the snap link 63.

In FIGURE 4 of the drawings, the snap acting mechanism 60 is in such a position that a very slight retraction of the piston 69 of the thermally responsive element 12 will cause the snap link 63, snap spring 81 and spring tensioner 94 to move upwardly to the dotted line position shown in this figure. As the snap link 63 snaps upwardly, it will strike the lower end portion of the recess formed by the reduced diameter portion of the valve stem 55, and move the valve 39 to an open position with a snap action.

It may be seen from FIGURE 4, that the seat 80 for the snap spring 81, the knife edge fulcrum 87 for the snap lever 63, and the point of engagement of the tension screw 97 with the downturned end 100 of the snap link 63 lie on a straight line, so that a very slight retraction of the element piston will accommodate the fulcrum point 87 to move downwardly of this line past a dead center position, and will accommodate the snap spring 81 to snap the snap link 63 in an upward direction.

As the piston 69 is extensibly moved to move the knife edge fulcrum 87 upwardly toward a line extending through the spring seat 80 and point of engagement of the tensioner screw 99 with the snap link 63, the force imposed by the snap mechanism on the valve stem gradually declines. A position will be reached at which this force falls below the force of the valve spring 51. Closing movement of the valve then begins.

The snap link 63 and actuating spring 81 are rotated downward (counter clockwise) about the fulcrum 87 as a result of the valve movement. This brings about further reduction in the mechanism force, and the valve accelerates toward its seat. As the link rotates, the line extending between the spring seat 80 and the point of engagement of the tensioner screw 99 with the snap link 63 is also rotated downward (counter clockwise). When the line crosses the knife edge fulcrum 87, the mechanism goes through the "over-center" position and the link snaps downward. Until the "over-center" configuration is reached, the mechanism opposes valve movement. After the "over-center" position has been reached, the mechanism assists the valve spring in closing the valve. It should be understood that the various parts must be so designed that the valve cannot reach its seat until the mechanism has passed through the "over-center" position.

The process of valve closing occurs rapidly. That is, once valve closing movement begins, the described sequence of events is completed in a fraction of a second, and hence throttling of the flow is precluded.

It may be seen from the foregoing that an improved form of gas safety and thermostatic valve has been provided, utilizing an improved form of snap-acting mechanism for opening and closing the valve, and that closing of the valve is attained by extensible movement of the piston 69 of the thermally responsive element, while opening of the valve is attained by retractable movement of said piston.

It may further be seen that the temperature of opening of the valve may readily be changed by changing the over-center position of the snap spring by operation of the temperature adjustment knob 76, and that when the hinge 80 for the snap spring 81 is moved downwardly toward or beyond the plane of the knife edge fulcrum 87, the temperature of opening of the valve will be lowered, while when the spring seat 80 is moved upwardly with respect to the knife edge fulcrum 87, the temperature at which the valve 39 will open will be raised, and that the snap-acting mechanism will operate in one direction or another each time the knife edge fulcrum 87 moves above or below a line extending through the hinge 80 and the point of engagement of the spring tensioner screw 97 with the snap link 63.

It may further be seen that the snap-acting mechanism is of a simple construction, that the frame for the snap-acting mechanism forms the return spring for the piston 69 of the thermally responsive element 12, and that a minimum of parts is required to actuate the valve 39 with a snap action, as well as to vary the temperature range of opening or closing of said valve.

While I have herein shown and described one form in which my invention may be embodied, it may readily be understood that various modifications and variations in the invention may be attained without departing from the spirit and scope of the novel concepts thereof, as defined by the claims appended hereto.

I claim as my invention:

1. The combination with a snap-acting mechanism and an actuator and adjustment member therefor, a generally U-shaped main spring having a closed end portion and horizontally disposed generally parallel legs extending therefrom, said actuator for said snap-acting mechanism comprising a rectilinearly movable member movable generally perpendicularly to said legs, and seated on a first of said legs adjacent the open end of said spring, said adjustment member being movable toward and from said actuator and being spaced outwardly from a second of said legs and facing said actuator and seated on said second leg, a fulcrum member extending vertically from said first leg toward said second leg and having a knife edge fulcrum thereon intermediate said legs, a snap link in contact with and fulcrumed on said knife edge fulcrum and extending from said fulcrum toward the closed end of said spring, a tongue extending from said second leg angularly outwardly therefrom toward the longitudinal centerline of said spring, and a snap spring seated on said tongue at one end and on said snap link at its opposite end and biasing said snap link into engagement with said fulcrum and snapping said snap link past a dead center position upon movement of said actuator member to position said knife edge fulcrum to either side of a dead center position with respect to the point of engagement of said snap spring with the end of said tongue and the point of reaction of said snap spring on said snap link.

2. The combination with a snap-acting mechanism and an actuator and adjustment member therefor, a generally U-shaped main spring having a closed end portion at one end thereof and horizontally disposed generally parallel first and second legs extending therefrom, said actuator member being seated on said first leg adjacent the open end of said spring for operating said snap-acting mechanism, said adjustment member being spaced from and facing said actuator member and seated on said second leg adjacent the open end of said spring, a fulcrum member extending vertically from said first leg toward said second leg and having a knife edge fulcrum on the inner end thereof, a snap link in contact with and fulcrumed on said knife edge fulcrum, a tongue extending from said second leg toward the center of said main spring and having a spring hinge on the inner end thereof and spaced from said knife edge fulcrum and extending along said spring between said legs, a tensioning member connected with the opposite end of said snap spring from said spring hinge and having substantially point engagement with said snap link in alignment with said knife edge fucrum and said spring seat when said snap-acting mechanism is in a dead center position, whereby movement of said knife edge fulcrum past a dead center position effected by movement of said actuator member toward or from said adjustable member will effect snapping of said snap link over a dead center position toward either of said legs, dependent upon the position of said knife edge fulcrum with respect to a dead center position.

3. The combination with a snap-acting mechanism and an actuator and adjustment member therefor, a generally U-shaped main spring having a closed end portion at one end thereof and having first and second horizontally disposed legs extending therefrom, said actuator member having said first leg seated thereon and being movable in a direction generally perpendicular to said leg for operating said snap-acting mechanism, said adjustment member spaced from and facing said actuator member and having said second leg seated thereon adjacent the open end of said spring and being adjustably movable in a direction perpendicular to said second leg, a fulcrum member extending vertically from said first leg toward said second leg adjacent the open end of said spring and having a knife edge fucrum on the inner end thereof, a tongue extending from said second leg toward the center of said spring and having a spring hinge on the inner end thereof, spaced outwardly of said knife edge fulcrum, a snap link in contact with said knife edge fulcrum and extending from said knife edge fulcrum along said spring between said legs, a snap spring seated on said spring hinge at one end, a tensioning member connected with the opposite end of said snap spring from said spring hinge and having substantially point engagement with said snap link in alignment with said knife edge fulcrum and the point of engagement of said snap spring with said spring hinge when said snap-acting mechanism is in a dead center position, whereby operation of said actuator to move said knife edge fulcrum past a dead center position will effect snap action of said snap link over a dead center position toward said first or said second leg dependent upon the position of said knife edge fulcrum with respect to a dead center position, and means for manually operating said adjustment member to effect movement of said spring hinge with respect to an extended line extending through said knife edge fulcrum and the point of contact of said spring tensioner with said snap link, to thereby vary the movement of said actuator required to operate said snap link.

4. The combination with a snap-acting thermostatically operated mechanism and thermostatically operated actuator and adjustment member therefor, return spring means for said actuator comprising a generally U-shaped spring having a closed end portion and horizontally disposed first and second legs extending therefrom, an ear extending vertically outwardly from said first leg and seated on said actuator, an ear extending vertically outwardly from said second leg and seated on said adjustment member, means for varying the position of said adjustment member with respect to said actuator to vary the temperature of operation of said snap-acting mechanism, said actuator and said adjustment member being adapted to support said spring within a casing, a fulcrum member extending from said first leg toward the longitudinal center of said spring and having a knife edge fulcrum on the inner end thereof, a seating member extending from the outer end of said second leg toward the longitudinal center of said spring in outwardly spaced relation with respect to said knife edge fulcrum and having a spring hinge on the end thereof, a snap link in contact with said knife edge fulcrum and extending along said spring between said legs toward the closed end thereof, a snap spring seated on said spring hinge at one end, a tensioning member connected with the opposite end of said snap spring from said spring hinge and having substantially point engagement with said snap link in alignment with said knife edge fulcrum and said spring hinge when said snap-acting mechanism is in a dead center position, extensible movement of said actuator moving said fulcrum past the centerline of said snap spring in one direction to effect snap action of said snap link in one direction and retractible movement of said actuator effected by said U-shaped spring and reductions in temperature effecting movement of said knife edge fulcrum to an opposite side of the centerline of said snap spring to effect snapping of said link in an opposite direction.

References Cited in the file of this patent
UNITED STATES PATENTS

| | | |
|---|---|---|
| 2,006,930 | Newell et al. | July 2, 1935 |
| 2,216,806 | Condit | Oct. 8, 1940 |
| 2,296,898 | Bondurant | Sept. 29, 1942 |
| 2,303,994 | Green | Dec. 1, 1942 |
| 2,405,014 | Caparone | July 30, 1946 |
| 2,548,941 | Brown | Apr. 17, 1951 |